US007310576B1

(12) United States Patent
Letang

(10) Patent No.: US 7,310,576 B1
(45) Date of Patent: Dec. 18, 2007

(54) METHOD AND SYSTEM TO CONTROL INTERNAL COMBUSTION ENGINE IDLE SHUT DOWN

(75) Inventor: Dennis Michael Letang, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 20 days.

(21) Appl. No.: 11/448,322

(22) Filed: Jun. 7, 2006

(51) Int. Cl.
*B60K 15/00* (2006.01)
*G06F 11/30* (2006.01)

(52) U.S. Cl. ....................................................... 701/112

(58) Field of Classification Search ................ 701/112, 701/102, 200, 36; 123/179.4
See application file for complete search history.

(56) References Cited

U.S. PATENT DOCUMENTS 4,050,436 A 9/1977 Crabtree
4,286,683 A 9/1981 Zeigner et al.
4,312,310 A 1/1982 Chivilo et al.
4,347,817 A 9/1982 Muller
4,419,866 A 12/1983 Howland
4,421,076 A 12/1983 Mandel
4,482,812 A 11/1984 Hori et al.
4,534,326 A 8/1985 Bowcott
4,694,807 A 9/1987 Mori
4,741,164 A 5/1988 Slaughter
4,878,465 A 11/1989 Hanson et al.
5,072,703 A 12/1991 Sutton
5,140,826 A 8/1992 Hanson et al.
5,186,015 A 2/1993 Roehrich et al.
5,222,469 A 6/1993 Sutton
5,275,011 A 1/1994 Hanson et al.
5,619,412 A * 4/1997 Hapka ......................... 701/36
6,363,906 B1 4/2002 Thompson et al.
6,595,180 B2 6/2003 Thompson et al.
6,768,221 B2 * 7/2004 Klinger et al. ............. 307/10.7
6,814,053 B2 11/2004 Hawkins et al.
7,036,477 B1 * 5/2006 Thompson et al. ...... 123/179.4
2004/0055558 A1 * 3/2004 McElroy .................. 123/179.4

FOREIGN PATENT DOCUMENTS

EP 1 170 165 A2 * 1/2002

* cited by examiner

*Primary Examiner*—Hieu T. Vo
(74) *Attorney, Agent, or Firm*—Rader, Fishman & Grauer, PLLC.

(57) ABSTRACT

A method for controlling a compression ignition electronic control module equipped compression ignition internal combustion engine installed in a vehicle to permit engine idling to conform to requirements of a geographical location.

9 Claims, 3 Drawing Sheets

METHOD AND SYSTEM TO CONTROL INTERNAL COMBUSTION ENGINE IDLE SHUT DOWN

BACKGROUND OF THE INVENTION

1. Field of the Invention

The present invention relates to a method of enhanced engine idle shutdown override, wherein an engine equipped with an electronic control module (ECM) receives a signal indicating its geographic location and would conform its engine idle routines to the requirements of the particular geographical location.

The present invention further relates to a method to restrict engine idle shutdown. The invention restricts extended idling only in states that do not allow extended idling but allows extended idling in states that do not restrict idling. It is contemplated that the vehicle could identify its location through means of a global positioning system and by use of a look-up table or other means, and implement the particular idling strategy permitted by the laws of that state.

The present invention further relates to a method to provide for an external communication system such as a satellite tracking system to communicate to the vehicle its geographical location. Engine idling strategies could then be implemented based upon geographical location.

The present invention further relates to a method to control the idle strategy of an internal combustion engine by having the driver communicate to the engine controller the vehicle geographical location. In each instance, the idling strategy would be stored in a look-up table that is conformable to the requirements of the laws of the particular state in which the vehicle is located. By identifying which state the vehicle is located, the ECM can determine whether extended idling is permitted. If the extended idling is not permitted the vehicle will shut down after reaching the maximum idling time for that state, and the idle shutdown override will not be permitted. This time limit could vary from state to state. To handle this, the ECM would, as previously stated, contain a table of maximum idle times for each state.

2. Description of the Related Art

Hawkins et al., U.S. Pat. No. 6,814,053 discloses an engine control system that employs a microprocessor base controller to detect engine operation in the speed range previously determined to undesirable, and responding to the detection by changing operation of the engine. In the preferred embodiment, a controller commands a parameter for adjusting engine operation to reach a different speed outside of first and second thresholds defining the undesirable range in a time period subsequent to detection. There is no disclosure of any means whereby the ECM is notified as to which geographical location of the vehicle and no indication that alternative idling strategies are contained within look-up tables for use in specified geographical locations.

Thompson et al., U.S. Pat. No. 6,363,906 discloses a system and method for controlling compression ignition engines having an electronic control module with an idle shutdown feature to automatically stop the engine after idling for a period of time including determining whether the engine is being loaded and overriding the idle shutdown feature to keep the engine running when the engine is being loaded. In one embodiment, Thompson et al. '906 includes monitoring operating conditions to determine that the vehicle is stationary, monitoring the engine to determine that the engine is idling, initiating a time counter to provide an indication of idling time, determining that the engine is operating in an auxiliary power mode, determining the engine load, and automatically stopping the engine when idle time exceeds a first threshold and the engine load is less than a second threshold. Thompson et al. '906 makes it difficult for engine operators to defeat idle shutdown features by detecting current engine operation conditions to verify that the selected operating mode is consistent with the current engine operating condition. There is no showing in Thompson et al. '906 of notifying the ECM in which geographic location the vehicle is located and altering the engine idle to conform to the specific legal requirements in that particular geographic location.

Thompson et al., U.S. Pat. No. 6,595,180 discloses a system and method for controlling a compression ignition engine having a electronic control module with a idle shutdown feature to automatically stop the engine after idling for a period of time including determining whether the engine has been loaded not allowing idle shutdown feature to keep the engine running when the engine is being loaded. There is no showing of notifying the ECM of its geographical location and then modifying the idle operation of the engine to conform to legal requirements of that particular geographical location.

Diesel engines have a wide variety of applications including passenger vehicles, marine vessels, earth-moving and construction equipment, stationary generators, and on-highway trucks, among others. Electronic engine controllers provide a wide range of flexibility in tailoring engine performance to a particular application without significant changes to engine hardware. While diesel fuel is often less expensive, and diesel engines are more efficient than gasoline powered engines, diesel engine applications often require running the engine continuously over long periods of time. This may conflict with certain environmental regulations of various states that seek to regulate the emissions and particulates released by vehicles operating within their respective borders. In addition, it is a challenge that various states have differing regulations requiring the operator of a vehicle having a regulated engine to adapt to a variety of emission standard, based upon the geographical location of the vehicle at any given time.

In many diesel engine applications, the engine operator does not own the engine, does not understand the environmental regulations in a given geographical location, does not and cannot vary the operation of the engine and does not pay for the fuel, or engine maintenance. However, the operators may pay for the fines associated with the operation of the engine. In addition, the operator often seeks maximum power and ease of operation whereas the owner strives to achieve maximum fuel economy and compliance with statutory regulations of which the operator is oftentimes unaware. To further control, engine operation and fuel efficiency, manufacturers have developed and implemented various electronic engine control features which attempt to control engine operation and optimize fuel economy while maintaining acceptable (although often not maximum) power for the particular application and operating conditions. Furthermore, features have been provided which allow the engine owner to impose operational limits on the engine as well as the engine operator to promote safety, fuel economy and compliance with emissions regulations. As such, a systems and method to control the engine idling operation to conform with environmental regulations in various geographical locations is needed to conform to regulations, improve fuel economy, operator's desire of ease of operation, and to keep the engine running in manner as permitted by regulations in various states through which the vehicle may pass.

Idle shutdown is an electronic engine control feature designed to prevent unnecessary engine idling with resulting lower fuel economy and emissions to the environment. During driving situations, on-highway truck drivers often leave the engine idling for extended periods of time for various reasons, such as avoiding the difficulty in restarting the engine or keeping the vehicle warm, for example. In one implementation of an idle shutdown feature, when the engine controller determines that the vehicle is parked and the engine has been idling for some period of time, the engine controller automatically stops the engine. The idle shutdown includes an automatic override feature to prevent the engine from being automatically stopped when the engine is being used to drive auxiliary equipment in power take-off (PTO) mode. For example, the engine may be running a generator to cool a refrigerated truck, driving a pump on a fire engine, powering hydraulics for a crane or construction equipment, etc. As such, drivers may "trick" the engine controller by placing the engine in a mode, such as PTO mode, which automatically overrides the idle shutdown feature even though the engine is not actually being used to drive any auxiliary equipment.

SUMMARY OF THE INVENTION

The present invention addresses these concerns. The present invention is a method for operating a compression ignition internal combustion engine that will conform to the environmental regulations of various states through which the vehicle passes by conforming the idling strategies of the engine to the requirements of the state within which the vehicle is located during actual driving situations but will not interfere with the operation of the engine, for example, when it is used to power auxiliary equipment, and which will prevent an operator from operating the engine in a false PTO mode. Accordingly, the method includes a step of determining whether the engine is idling and whether the engine is located within a geographical location that restricts engine idling. The method further includes a step of determining whether the engine is loaded in a power takeoff mode. The method further includes a step of determining whether the engine idle time is greater than or equal to the allowed engine idle time within the geographical location within which the engine is operating and shutting down the engine when the engine idle time exceeds the allowed idle time.

DETAILED DESCRIPTION OF A PREFERRED EMBODIMENT(S)

Figure 1:
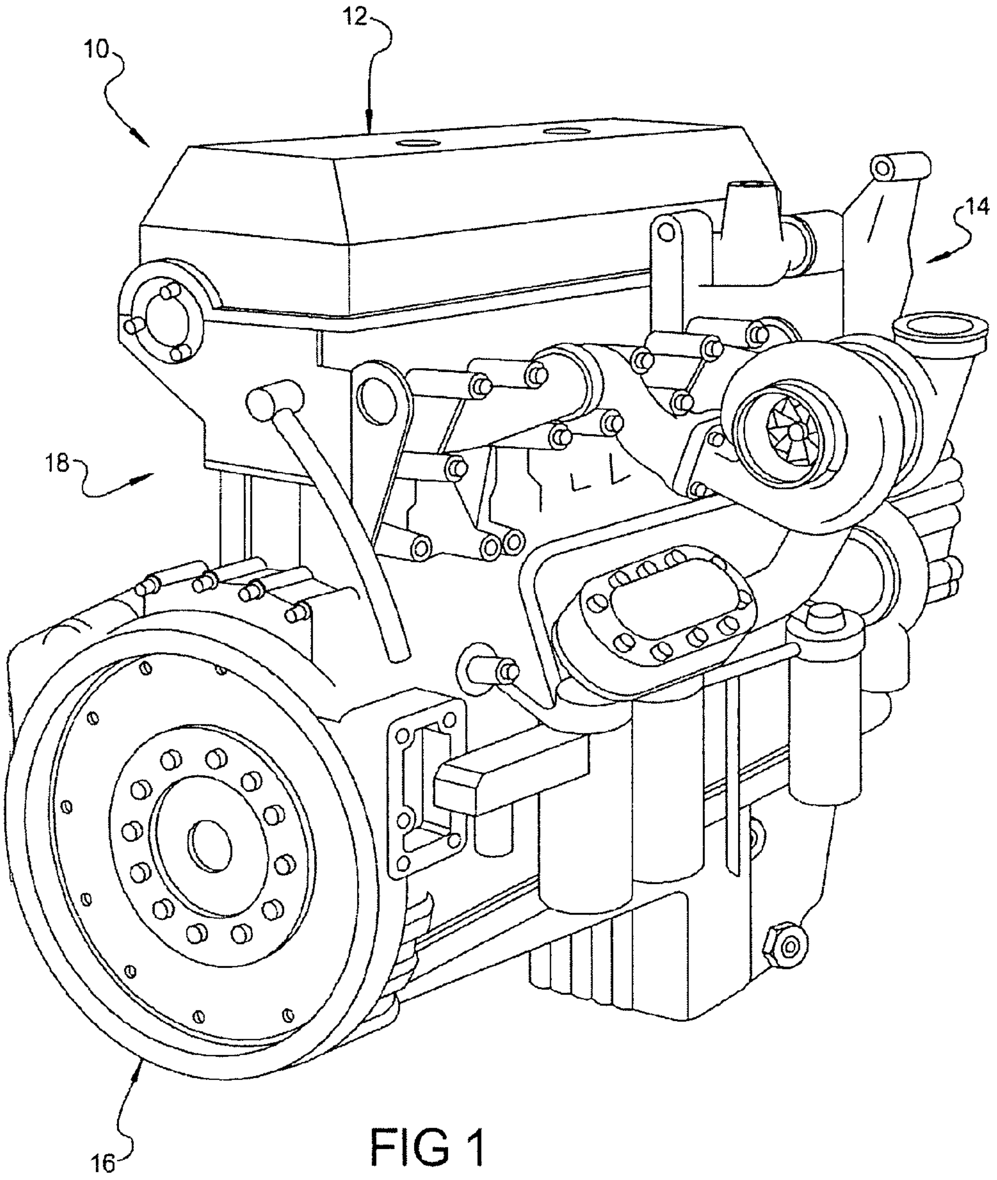
FIG. 1 is a perspective view of an internal combustion engine incorporating various features of the present invention.

Turning now to the drawings wherein like numbers refer to like structures, and particularly to FIG. 1, there is shown a perspective view of a compression-ignition internal combustion engine 10 incorporating various features according to the present invention. As will be appreciated by those of ordinary skill in the art, engine 10 may be used in a wide variety of applications including on-highway trucks, construction equipment, marine vessels, and stationary generators, among others. Engine 10 includes a plurality of cylinders disposed below a corresponding cover, indicated generally by reference numeral 12. In a preferred embodiment, engine 10 is a multi-cylinder compression ignition internal combustion engine, such as a 4, 6, 8, 12, 16, or 24, cylinder diesel engine, for example. Moreover, it should be noted that the present invention is not limited to a particular type of engine or fuel.

Engine 10 includes an engine control module (ECM) or controller representatively indicated by reference numeral 14. ECM 14 communicates with various engine sensors and actuators via associated cabling or wires, indicated generally by reference numeral 18, to control the engine. In addition, ECM 14 communicates with the engine operator using associated lights, switches, displays, and the like as illustrated in greater detail in FIG. 2. The ECM 14 may also have the ability to communicate with Global Positioning Satellites or similar wireless forms or communication to review data useful to the operation of the engine. When mounted in a vehicle, engine 10 is coupled to a transmission via flywheel 16. As is well known by those in the art, many transmissions include a power take-off (PTO) configuration in which an auxiliary shaft may be connected to associate auxiliary equipment that is driven by the engine/transmission at a relatively constant rotational speed using the engine's variable speed governor (VSG). Auxiliary equipment may include hydraulic pumps for construction equipment, water pumps for fire engines, power generators, and any of a number of other rotationally driven accessories. Typically, the PTO mode is used only while the vehicle is stationary. However, from the description that follows, those who have ordinary skill in the art will appreciate that the present invention is independent of the particular operation mode of the engine, or whether the vehicle is stationary or moving for those applications in which the engine is used in a vehicle having a PTO mode.

Figure 2:
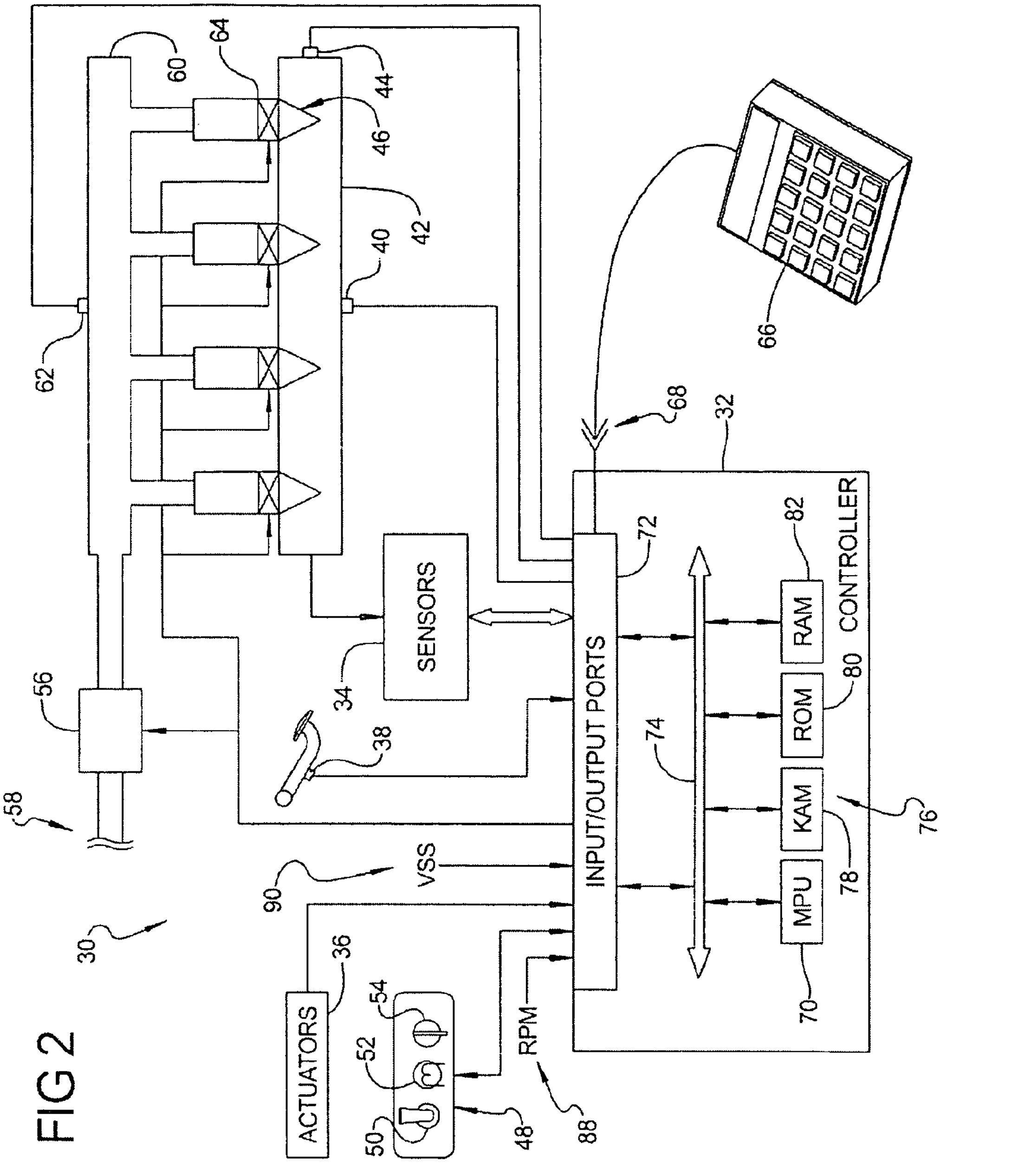
FIG. 2 is a block diagram illustrating a system for implementing idle shut down strategies according to the present invention.

Referring now to FIG. 2, a block diagram illustrating a system for idle shutdown override with defeat protection according to the present invention is shown. System 30 represents the control system for engine 10 of FIG. 1. System 30 preferably includes a controller 32 in communication with various sensors 34 and actuators 36. Sensors 34 may include various position sensors such as an accelerator or brake position sensor 38. Likewise, sensor 34 may include a coolant temperature sensor 40 that provides an indication of the temperature of engine block 42. Likewise, an oil pressure sensor 44 is used to monitor engine-operating conditions by providing an appropriate signal to controller 32. Other sensors may include rotational sensors to detect the rotational speed of the engine, such as RPM sensor 88 and a vehicle speed sensor (VSS) 90 in some applications. VSS 90 provides an indication of the rotational speed of the output shaft or tail-shaft of a transmission (not shown) that may be used to calculate the vehicle speed. VSS 90 may also represent one or more wheel speed sensors that are used in anti-lock breaking system (ABS) applications, for example.

Actuators 36 include various engine components that are operated via associated control signals from controller 32. As indicated in FIG. 2, various actuators 36 may also provide signal feedback to controller 32 relative to their operational state, in addition to feedback position or other signals used to control actuators 36. Actuators 36 preferably include a plurality of fuel injectors 46 which are controlled via associated solenoids 64 to deliver fuel to the corresponding cylinders. In one embodiment, controller 32 controls a fuel pump 56 to transfer fuel from a source 58 to a common rail or manifold 60. Operation of solenoids 64 controls delivery of the timing and duration of fuel injection as is well known in the art. While the representative control system of FIG. 2 with associated fueling subsystem illustrates the typical application environment of the present invention, the invention is not limited to any particular type of fuel or fueling system.

Sensors 34 and actuators 36 may be used to communicate status and control information to an engine operator via a console 48. Console 48 may include various switches 50 and 54 in addition to indicators 52. Console 48 is preferably positioned in close proximity to the engine operator, such as in the cab of a vehicle. Indicators 52 may include any of a number of audio and visual indicators such as lights, displays, buzzers, alarms, and the like. Preferably, one or more switches, such as switch 50 and switch 54, are used to request a particular operating mode, such as cruise control or PTO mode, for example.

In one embodiment, controller 32 includes a programmed microprocessing unit 70 in communication with the various sensors 34, 38, 40, 44, 62 and actuators 36 via input/output port 72. As is well known by those of skill in the art, input/output ports 72 provide an interface in terms of processing circuitry to condition the signals, protect controller 32, and provide appropriate signal levels depending on the particular input or output device. Processor 70 communicates with input/output ports 72 using a conventional data/address bus arrangement 74. Likewise, processor 70 communicates with various types of computer-readable storage media 76 which may include a non-volatile RAM (NVRAM) 78, a read-only memory (ROM) 80, and a random-access memory (RAM) 82. The various types of computer-readable storage media 76 provide short-term and long-term storage of data used by controller 32 to control the engine. Computer-readable storage media 76 may be implemented by any of a number of known physical devices capable of storing data representing instructions executable by microprocessor 70. Such devices may include PROM, EPROM, BEPROM, flash memory, and the like in addition to various magnetic, optical, and combination media capable of temporary and/or permanent data storage.

Computer-readable storage media 76 include data representing program instructions (software), calibrations, operating variables, and the like used in conjunction with associated hardware to control the various systems and subsystems of the engine and/or vehicle. The engine/vehicle control logic is implemented via controller 32 based on the data stored in computer-readable storage media 76 in addition to various other electric and electronic circuits (hardware).

In one embodiment of the present invention, controller 32 includes control logic to reduce unnecessary engine idling and conform the engine idling to the regulations required by the geographical location within which the engine is operating. It is contemplated that the controller 32 has data tables that are loaded with idling requirements of any geographical location. Control logic implemented by controller 32 monitors operating conditions of the engine and/or vehicle to determine that the vehicle is stationary. Likewise, controller 32 determines that the engine has been idling for a period of time by initiating a timer/counter to track the idling time. Determining that the engine is idling may be performed in a number of manners. For example, an engine idling condition may be determined based on position of an accelerator pedal, or the engine speed being below a predetermined idle speed (which may vary according to the engine or ambient temperature). Controller 32 then determines the engine load to detect whether the engine is being used, for example, to drive an auxiliary device. However, those having ordinary skill in the art will appreciate that the present invention is not limited to this operational condition.

Controller 32 then will receive information relative to the geographical location of the engine and will automatically stop the engine when the idling time exceeds a programmable limit and the engine load is less than a second programmable limit indicating the engine is not being used to drive an auxiliary device. Of course, depending upon the particular application, one or more load thresholds may be utilized to determine whether the engine is being used to drive an auxiliary device.

As used throughout the description of the invention, a selectable or programmable limit or threshold may also be selected by any of a number of individuals via a programming device, such as device 66 selectively connected via an appropriate plug or connector 68 to controller 32. Rather than being primarily controlled by software, the selectable or programmable limit may also be provided by an appropriate hardware circuit having various switches, dials, and the like. Of course, the selectable or programmable limit may also be changed using a combination of software and hardware without departing from the spirit of the present invention.

As described above, compression ignition engines having an idle shut down feature have been employed to reduce the amount of unnecessary idling of the engine. Typically, the systems automatically stop the engine after a predetermined or selectable idling time to conserve fuel. However, many engine operators attempt to defeat this feature to keep the engine idling for an indefinite period of time. For example, a driver may want to keep the engine idling to avoid difficulty in restarting the engine after stopping at a rest area. As such, the driver "tricks" the engine by selecting an operating mode that does not activate or trigger the idle shut down feature. One example where an operator may attempt to override idle shut down occurs where an operator selects the PTO mode of operation even though the engine is not being used to drive an auxiliary load. Typically, operation in the PTO mode automatically disables the idle shut down feature of the engine. By selecting an operating mode (PTO) that is inconsistent with the current operating conditions (no auxiliary device connected), the operator has defeated the idle shut down feature. According to the present invention, controller 32 determines whether the requested operating mode is inconsistent with the current operating conditions to determine whether to automatically stop the engine. In one embodiment, engine controller 32 provides a warning to the operator to indicate that the engine will be automatically stopped. The driver is afforded a limited number of opportunities to override the automatic engine shut down. Preferably, controller 32 determines whether the requested operating mode is consistent (or inconsistent) with the current operating conditions by comparing the engine load to a selectable or programmable load threshold. If the engine is being used to drive an auxiliary device, the engine will be loaded accordingly. As such, controller 32 will override the automatic shut down feature to keep the engine running. However, if the engine operating conditions indicate that the selected mode of operation is inconsistent or inappropriate, the idle shutdown feature will be activated and the engine will be automatically stopped after the associated criteria have been satisfied, i.e. idle time, number of overrides, etc.

Figure 3:
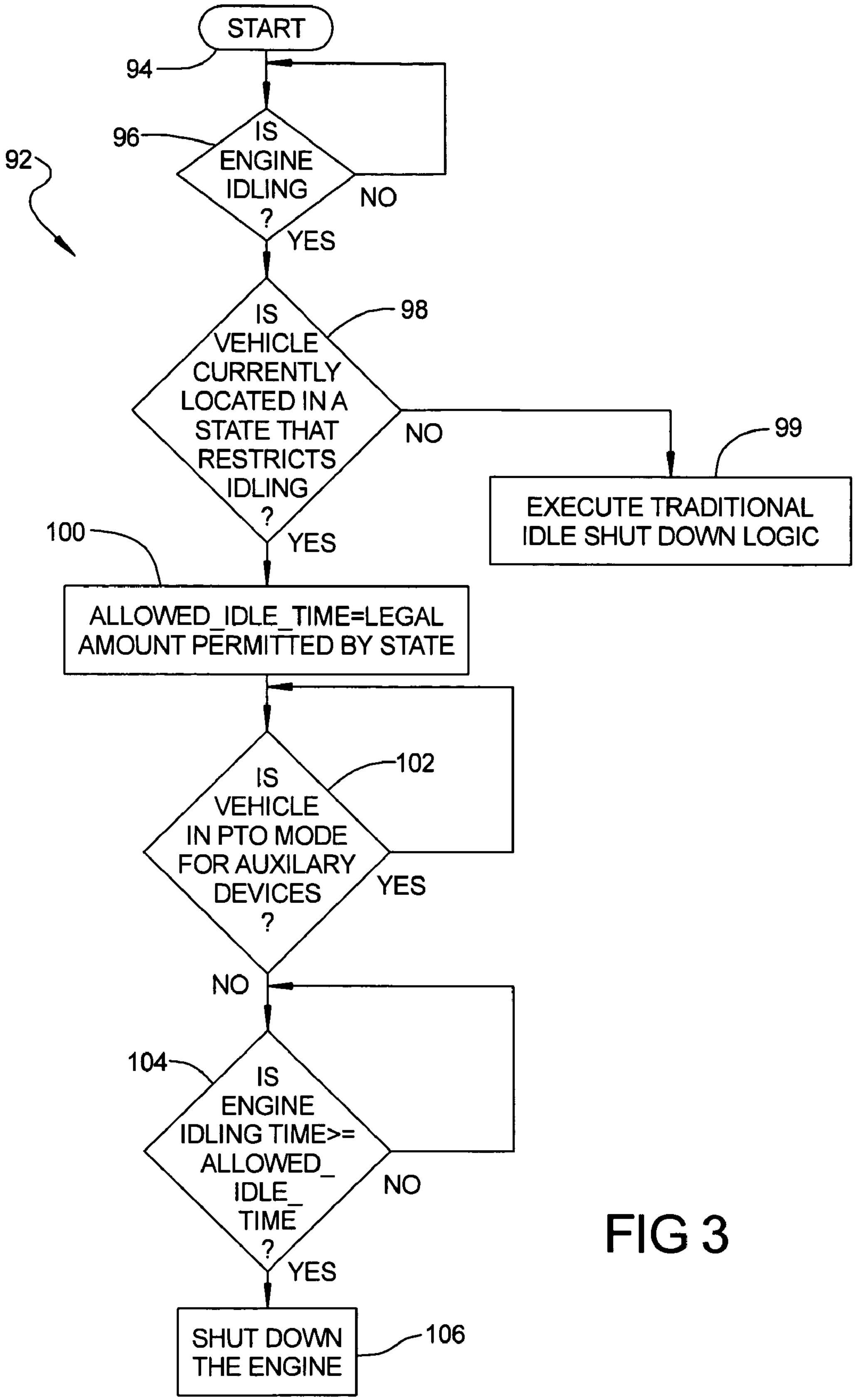
FIG. 3 is a block diagram illustrating operation of a system or method for controlling idle shut down strategies according to the present invention.

Turning to FIG. 3, there is illustrated a software flow diagram of one embodiment of the idle shutdown strategy of the present invention. The method of the present invention is illustrated in FIG. 3 in connection with one representative operational mode where the vehicle may be in a PTO mode for auxiliary devices. However, those having ordinary skill in the art will appreciate that this representation is exemplary, only, and that the method of the present invention is not limited for use only where the vehicle is in PTO mode for auxiliary devices. Specifically, method 92 initiates with starting the engine at step 94. Step 96 is determining whether the engine is idling. If the determination is made that the engine is idling, step 98 is determining whether the engine is currently in a geographical location that restricts idling. This may be accomplished by the ECM receiving a signal from a Global Positioning satellite system setting forth the geographical location of the engine, or by means of a wireless signal received by the ECM setting forth the geographical location of the engine, or by means of a hand held device that inputs the geographical location of the vehicle, or by any other means such as may be known by those of ordinary skill in the art. If the determination in step 98 is that the engine is not in a geographical location that restricts engine idle time, the ECM will proceed to step 99, which is executing a traditional idle shut down strategy such as is known in the art. If the determination is made that the engine is in a geographical location that restricts engine idling, reference is made to a look up table within the ECM and step 100 is determining the allowed idle time permitted by the geographical location within which the engine is operating. In the representative example illustrated here, step 102 is determining whether the engine is in PTO mode, and whether there are any auxiliary devices such as refrigeration or heating devices that are dependent upon the operation of the engine for operation. If the vehicle is in PTO mode and there are no auxiliary devices dependent upon the operation of engine, the method proceeds to Step 104, which is determining whether the engine idling time experienced by the engine at any given current operating time is greater than or equal to the allowed idling time permitted by the geographical location within which the engine is operating. If there are auxiliary devices that are dependent upon the operation of the engine, the system executes step 99.

If the engine idling time is greater than the allowed idle time, step 106 is shutting down the engine. The idle shut down strategy of the present invention may be overridden by merely depressing the accelerator pedal.

Those skilled in the art will understand that the terms used in this description are illustrative and are not intended to be limiting in any way to the scope of the invention. In addition, various modifications will become apparent to those skilled in the art without departing form the scope and spirit of the invention.

I claim:

1. A method for controlling an electronic control module equipped internal combustion engine idling to conform to requirements of a geographical location, comprising;

determining whether the engine is idling;

determining whether the engine is located within a geographical location that restrict engine idling;

determining whether the engine idle time is greater than or equal to the allowed engine idle time within the geographical location within which the engine is operating;

shutting down the engine when the engine idle time exceeds the allowed idle time within the geographical location within which the engine is operating.

2. The method of claim 1, further including the step of determining whether auxiliary devices mode require engine operation.

3. The method of claim 1, further including the step of overriding idle shutdown by depressing the accelerator pedal.

4. The method of claim 1, wherein the electronic control module is equipped with look up tables that contain data on engine idle operation permitted by any given geographical location.

5. The method of claim 1, wherein said geographical location of the engine is communicated to the electronic control module by wireless communication.

6. The method of claim 5, wherein said wireless communication is a global positioning satellite transmission signal.

7. The method of claim 1, wherein said geographical location of the engine is communicated to the electronic control module through an interface to the electronic control module.

8. The method of claim 1, wherein said power take off mode includes said auxiliary power mode.

9. The method of claim 1, further including monitoring the vehicle engine to determine whether the vehicle engine is idling.

* * * * *